United States Patent [19]

Takahashi et al.

[11] 4,256,963

[45] Mar. 17, 1981

[54] MASS SPECTROMETER

[75] Inventors: Sadao Takahashi; Yoshiaki Katoh, both of Katsuta, Japan

[73] Assignee: Hitachi, Ltd., Japan

[21] Appl. No.: 80,025

[22] Filed: Sep. 28, 1979

[30] Foreign Application Priority Data

Sep. 29, 1978 [JP] Japan ................................ 53-119348
Jun. 13, 1979 [DE] Fed. Rep. of Germany ....... 2831936

[51] Int. Cl.³ ................................................ B01D 59/44
[52] U.S. Cl. ........................................ 250/296; 250/281
[58] Field of Search ............... 250/281, 282, 283, 296, 250/297, 298, 299; 235/92 R

[56] References Cited

U.S. PATENT DOCUMENTS

| | | | |
|---|---|---|---|
| 3,475,604 | 10/1969 | Noda et al. | 250/281 |
| 3,610,921 | 10/1971 | Major | 250/283 |
| 3,689,764 | 9/1972 | Green | 250/296 |
| 3,803,410 | 4/1974 | Banner | 250/281 |

*Primary Examiner*—Bruce C. Anderson
*Attorney, Agent, or Firm*—Craig & Antonelli

[57] ABSTRACT

A linked scan type mass spectrometer wherein the mass number of a metastable ion originating from a precursor ion is measured by scanning the magnetic and electric fields at a constant ratio between the two fields. Calculation is performed on a first electrical signal representative of the mass number of the precursor ion, a second electrical signal corresponding to a value of the electric field at which the mass number of the precursor ion is detected, and a third electrical signal corresponding to a value of the electric field at which the metastable ion is detected during scanning of the electric field and magnetic field, to thereby determine the mass number of the metastable ion. The third electrical signal is obtained by measuring a value of the magnetic field which contributes to the dispersion of ions. Means is provided for correcting the measured value of the magnetic field, thereby determining the mass number of the metastable ion with high accuracy.

17 Claims, 8 Drawing Figures

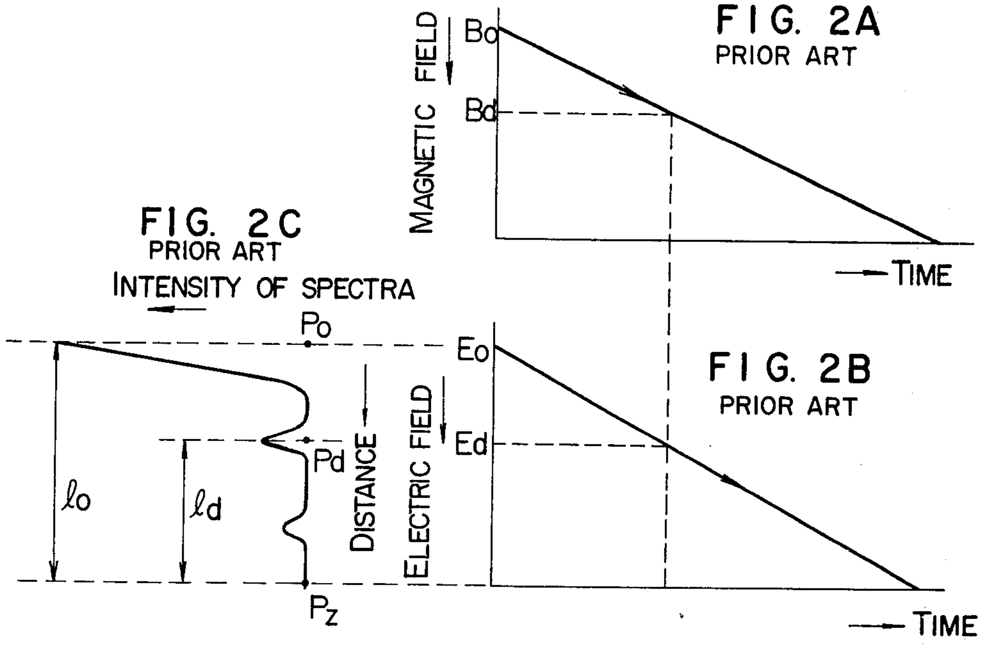
FIG. 2A PRIOR ART
FIG. 2B PRIOR ART
FIG. 2C PRIOR ART
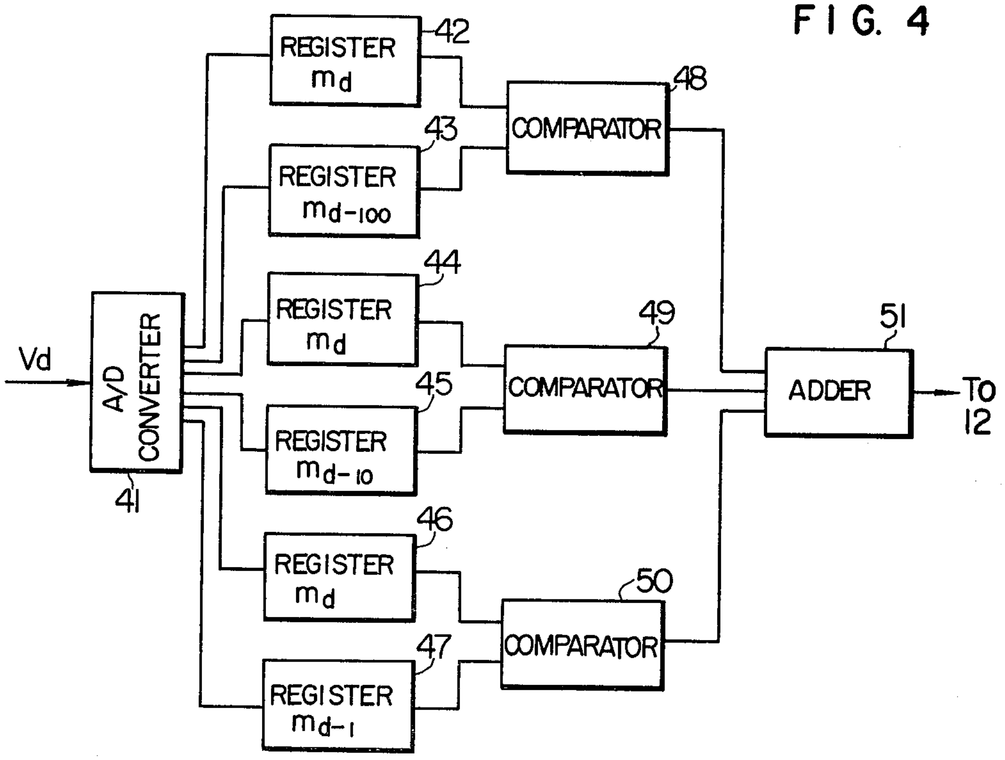
FIG. 4

MASS SPECTROMETER

BACKGROUND OF THE INVENTION

The present invention relates to mass spectrometers and more particularly, to a mass spectrometer suitable for measuring metastable ions.

Some of ions are so unstable thay they decompose near the exit of an ion source of the mass spectrometer in accordance with the following equation (1):

$$m_o^+ \rightarrow m_d^+ + (m_o - m_d) \quad (1).$$

The ion $m_o^+$ of a mass number of $m_o$ and the ion $m_d^+$ of a mass number of $m_d$ are usually called precursor ion and daughter ion, respectively.

Assuming now that, with a so-called double focusing mass spectrometer using electric and magnetic fields, the precursor ion $m_o^+$ is detected when the electric field is $E_o$ and the magnetic field is $B_o$ while the daugther ion $m_d^+$ is detected when the electric field is $E_d$ and the magnetic field is $B_d$, the following equations stand as generally known in the art:

$$m_d/m_o = E_d/E_o \quad (2)$$

$$m_d^2/m_o = m_d^* \quad (3)$$

$$B_d^2/B_o^2 = m_d^*/m_o \quad (4).$$

Accordingly, a combination of equation (3) with equation (4) is $$m_d/m_o = B_d/B_o \quad (5),$$

and a combination of equation (2) with equation (5) is $$B_o/E_o = B_d/E_d \quad (6).$$

These equations indicate that for the electric field being $E_d$, the peak of the daughter ion $m_d^{30}$ having the mass number $m_d$ occupies a spectrum representative of a mass number $m_d^*$ on the recorded spectra. The daughter ion $m_d^+$ is a very unstable ion resulting from the decomposition of the precursor ion near the exit of the ion source and is usually called metastable ion.

It is possible to measure the metastable ion through the use of a so-called linked scan type mass spectrometer in which the electric and magnetic fields are scanned at a constant ratio between the two fields so as to meet equation (6). In this measure, value of the electric field $E_o$ when detecting the precursor ion $m_o^+$ of the mass number $m_o$ is determined previously and a value of the electric field $E_d$ at which the metastable ion is detected is then determined. Thus, the mass number of the metastable ion $m_d^+$ calculated from equation (2). The value of the electric field $E_d$ is recorded on a recording paper for recording spectra or indicated on a voltmeter, and is determined by reading the recorded or indicated value. But the manual calculation is necessary for determination of the mass number of the metastable ion $m_d^+$, resulting in great inconvenience in data analysis.

SUMMARY OF THE INVENTION

An object of the present invention is to provide a mass spectrometer capable of readily determining the mass number of the metastable ion.

Another object of the present invention is to provide a mass spectrometer capable of accurately determining the mass number of the metastable ion.

According to the invention, the above objects can be accomplished by providing a mass spectrometer of linked scan type wherein a metastable ion originating from a precursor ion is measured by scanning the magnetic and electric fields at a constant ratio between the two fields, the mass spectrometer comprising means for generating a first electrical signal representative of the mass number of the precursor ion, means for generating a second electrical signal corresponding to a value of the electric field at which the precursor ion is detected, means for generating a third electrical signal corresponding to a value of the electric field which is being scanned, calculating means performing calculation on the first, second and third electrical signals for producing an output signal representative of the mass number of the metastable ion, and indicating means, responsive to the output signal of the calculating means, for indicating the mass number of the metastable ion.

Where the first, second and third electrical signals are $V_{mo}$, $V_{EO}$ and $V_{EX}$, the calculating means performs the calculation in accordance with $V_d = V_{mo} \cdot V_{EX}/V_{EO}$. This calculation is equivalent to $m_d = m_o \cdot E_d/E_o$ reduced from equation (2) and the calculated value $V_d$ stands for an electrical signal which corresponds to the mass number of the metastable ion $m_d^+$.

The means for generating the third electrical signal is preferably responsive to an output signal of a detector which detects the magnetic field in the mass spectrometer for generating the third electrical signal. This detector, however, fails to detect the value of the magnetic field with high accuracy. Therefore, in accordance with the present invention, the output signal of the detector is corrected to a signal ($V'_{EX}$). The calculating means for calculating the mass number of the metastable ion receives the corrected signal in place of the third electrical signal and provides the mass number of the metastable ion with high accuracy.

BRIEF DESCRIPTION OF THE DRAWINGS

FIGS. 2A to 2C are graphic representations useful to explain the manner of measuring the mass number of the metastable ion with the mass spectrometer shown in FIG. 1.

FIG. 4 shows, in block form, one example of a marker signal generator for use in the mass spectrometer of the invention.

DESCRIPTION OF THE PREFERRED EMBODIMENTS

For better understanding of the present invention, prior to describing embodiments of the invention, the manner of measuring the metastable ion with a prior art mass spectrometer will be described with reference to FIGS. 1 and FIGS. 2A through 2C.

Figure 1:
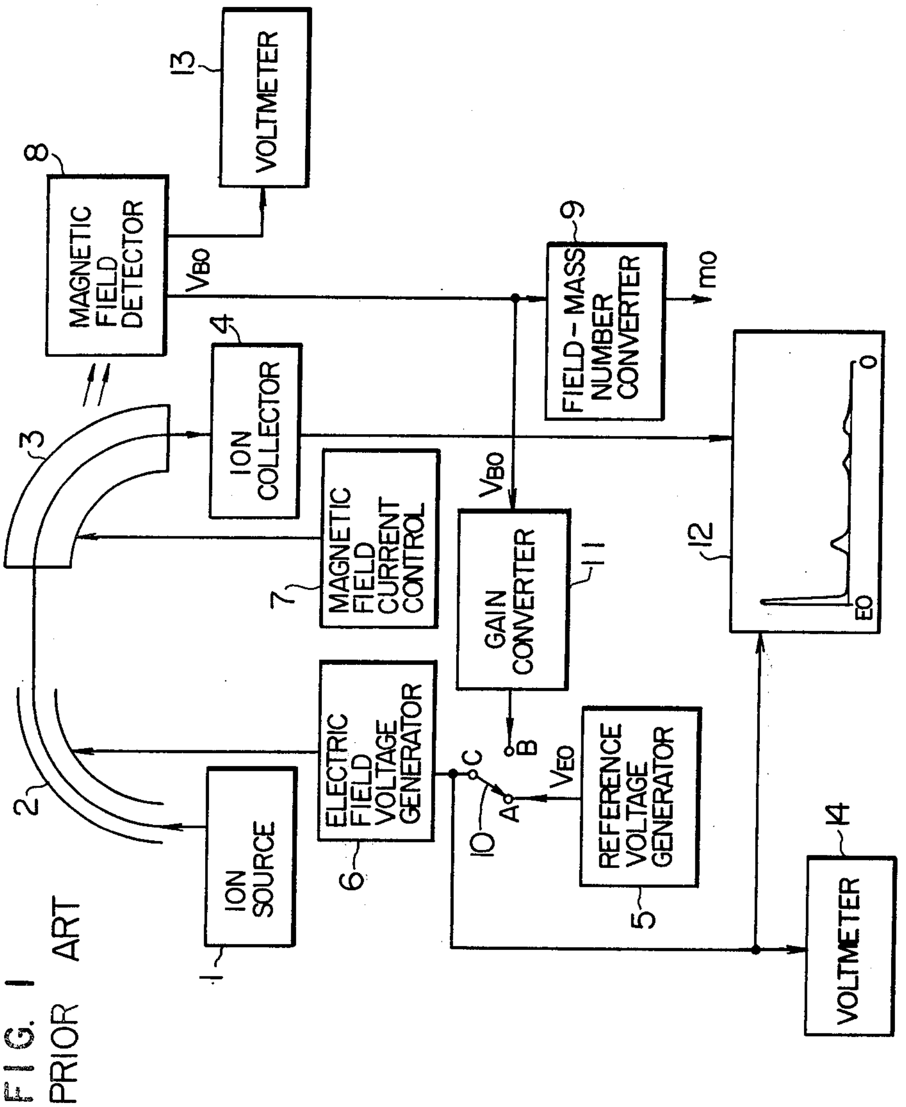
FIG. 1 PRIOR ART
FIG. 1 is a block diagram of a prior art mass spectrometer.

As diagrammatically shown in FIG. 1, ions derived out of an ion source 1 are subjected to energy dispersion in the electric field formed between a pair of electrodes 2 and are then subjected to mass dispersion in the magnetic field in an electromagnet 3. As a result, a specified ion which is identified depending on the ion accelerating voltage, electric field and magnetic field can be detected by an ion collector 4.

With the mass spectrometer of FIG. 1, it is now assumed that the decomposition pursuant to equation (1) takes place in a field free region between the ion source 1 and the electric field. An electric field voltage generator 6 supplies a voltage across the paired electrodes 2, which voltage develops in response to voltage $V_{EO}$ applied to the electric field voltage generator 6 from a reference voltage generator 5 via contacts A and C of a transfer switch 10 and establishes electric field $E_o$ necessary for detecting a precursor ion $m_o^+$. A magnetic field current control 7 supplies to the electromagnet 3 a current for establishing magnetic field $B_o$ which is necessary for detecting the precursor ion $m_o^+$. The magnetic field $B_o$ is detected by a magnetic field detector 8 comprising a Hall element, for example, which generates a voltage $V_{Bo}$ by detecting the magnetic field. Voltage $V_{Bo}$ is converted into corresponding mass number $m_o$ by means of a field-mass number converter 9 which in turn produces an output representative of the mass number $m_o$ of the precursion ion $m_o^+$. The output voltage $V_{Bo}$ of the magnetic field detector 8 is also supplied to a gain converter 11.

The output voltage $V_{Bo}$ of the magnetic field detector 8 is confirmed by means of, for example, a digital voltmeter 13 and thereafter the gain of the gain converter 11 is set to $V_{Eo}/V_{Bo}$ so as to make the output of the gain converter 11 equal to voltage $V_{Eo}$. Under this condition, the transfer switch 10 is transferred from contact A to contact B to let the electric field voltage generator 6 respond to the output of the gain converter 11, and the magnetic field is scanned from $B_o$ to zero as shown in FIG. 2A by varying the current of the magnetic field current control 7. Thus, the electric field is scanned as a function of time from $E_o$ to zero at a constant ratio between the magnetic and electric fields as shown in FIG 2B. The condition of the constant ratio between the magnetic and electric fields meets equation (6) and the scanning of the magnetic and electric fields at the constant ratio between the two fields is generally termed linked scan.

During the linked scan, the output voltage of the gain converter 11 is applied to a recorder 12, for example, to X-axis input of an X–Y recorder via contacts B and C of the switch 10 and the output signal of the ion collectro 4 is applied to Y-axis input of the X–Y recorder. Then, a spectrum of the metastable ion originating from the precursor ion $m_o^+$ can be recorded on a chart of the recorder as shown in FIG. 2C.

In FIG. 2C, a distance between a position $P_z$ on chart where the electric field applied is zero and a position $P_d$ on chart where the electric field applied is $E_d$ so that the peak of the metastable ion appears is denoted by $l_d$, and a distance between the position $P_z$ and a position $P_o$ on chart where the electric field applied is $E_o$ so that the peak of the precursor ion appears is denoted by $l_o$. Then, $E_d/E_o=l_d/l_o$ stands. This relation is combined with equation (2) to obtain $m_d=m_o \cdot l_d/l_o$ which gives the mass number of the metastable ion $m_d^+$. Obviously, it is also possible to calculate the mass number $m_d$ from equation (2) after measuring the value of $E_d$ by means of, for example, a digital voltmeter 14.

In any case, determination of the mass number of the metastable ion relies on the manual calculation on equation (2), resulting in great inconvenience in data analysis.

Figure 3:
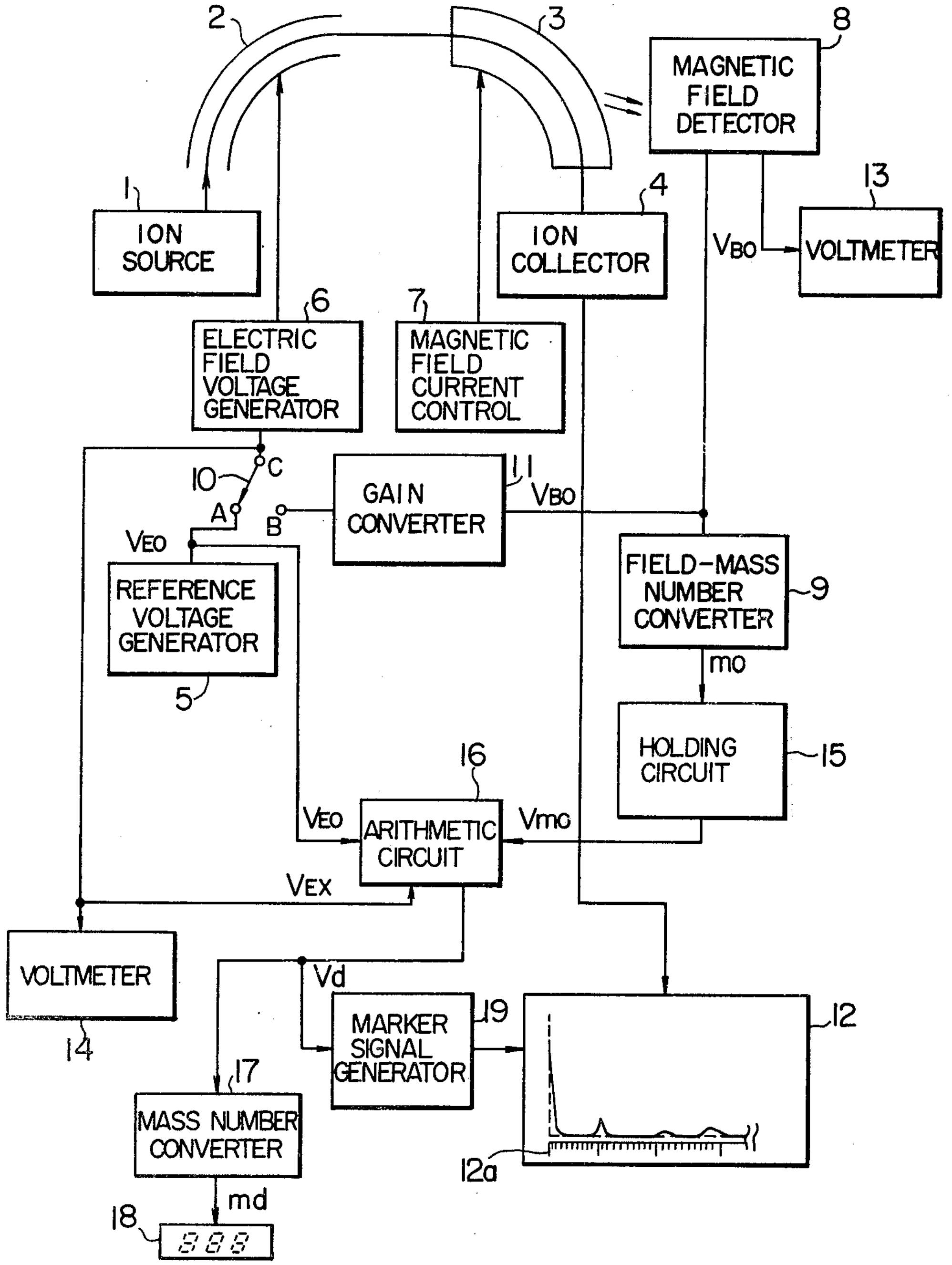
FIG. 3 is a block diagram of one embodiment of a mass spectrometer in accordance with the invention.

Referring now to FIG. 3, one embodiment of a mass spectrometer of the invention will be described. In FIG. 3, the same components as those in FIG. 1 are designated by the same reference numerals. A first electrical signal representative of the mass number of the precursor ion takes the form of an output $V_{mo}$ from a holding circuit 15 comprising a memory, for example. An arrangement or the means for generating the first electrical signal $V_{mo}$ is herein exemplified as including a magnetic field detector 8, a field-mass number converter 9 and the holding circuit 15. The output of the field-mass number converter 9 representing the mass number $m_o$ of the precursor ion is stored in the holding circuit 15 which permits constant supply of the electrical signal $V_{mo}$ representative of the mass number of the precursor iron.

An arrangement or the means for generating the second electrical signal $V_{Eo}$ corresponding to value $E_o$ of the electric field at which an ion collector 4 detects the precursor ion is exemplified herein as including a reference voltage generator 5.

Also, an arrangement or the means for generating the third electrical signal $V_{Ex}$ corresponding to the value of the electric field that is being scanned is exemplified herein as including the magnetic field detector 8, a gain converter 11, and a transfer switch 10. The output of the magnetic field detector 8 representative of the value of the magnetic field that is being scanned is converted into the value of the electric field corresponding to the value of the magnetic field of interest by means of the gain converter 11 which delivers therefrom the output standing for the third electrical signal $V_{Ex}$ and being passed on via contacts B and C of the transfer switch 10.

Exemplified herein as a calculating means or arrangement for performing calculation on the first, second and third electrical signals to provide the mass number of the metastable ion is an arithmetic circuit 16 in which the calculation on the three input signals is performed in accordance with $$V_{mo} \cdot (V_{Ex}/V_{Eo}=V_d \quad (7),$$

where $V_d$ represents an electrical signal corresponding to the mass number $m_d$ of the metastable ion. An arrangement or the means for indicating the mass number is exemplified herein as including a mass number converter 17 which converts the electrical signal $V_d$ into a value proportional to the mass number and a digital indicator 18 using, for example, LED elements which indicates degitally the output of the mass number converter 17. Thus, the electrical signal $V_d$ is converted and indicated, in terms of the mass number, on the digital indicator 18. The indicator arrangement may include a marker signal generator 19 which generates spike signals each time the mass number counts 1, 10 and 100, for example, and a recorder 12 for marking the mass number, as denoted by 12*a*, on its chart in accordance with the spike signals. In this embodiment, the recorder comprises an X–Y recorder and markings representing the mass number are indicated on X-axis. The mass number $m_d$ of the metastable ion can be read directly from the markings.

The arithmetic circuit 16 is exemplified in this embodiment as including an A/D converter which converts the first, second and third analog electrical signals into digital signals and a micro computer which performs predetermined calculation on the digital outputs of the A/D converter. Alternatively, the arithmetic circuit 16 may be an analog calculation circuit such as for example IC Programmable Multiplier Divider Computation Circuit AD 531 manufactured by Analog Device Co., Ltd.

FIG. 4 shows one example of the marker signal generator. The analog signal $V_d$ corresponding to the mass number of the metastable ion is supplied to an A/D converter 41 and converted therein into a digital signal. Where the output of the A/D converter represents the mass number $m_d$, a register 46 stores $m_d$ and a register 47 stores $m_{d-1}$. A comparator 50 detects the difference in mass number between the two registers and feeds to an adder 51 a signal indicating that the mass number changes by one. At this time, the adder 51 supplies to the recorder 12 a marker signal based on the output signal from the comparator 50. Registers 44 and 45 and a comparator 49 produce a signal to be supplied to the adder 51 when the difference in mass number between the registers 44 and 45 is ten, and registers 42 and 43 and a comparator 48 produce a signal to be supplied to the adder 51 when the mass number changes by one hundred. Accordingly, the adder 51 generates different marker signals each time the mass number counts 1, 10 and 100 so that markings corresponding to the mass number of the metastable ion are indicated on chart of the recorder.

Figure 5:
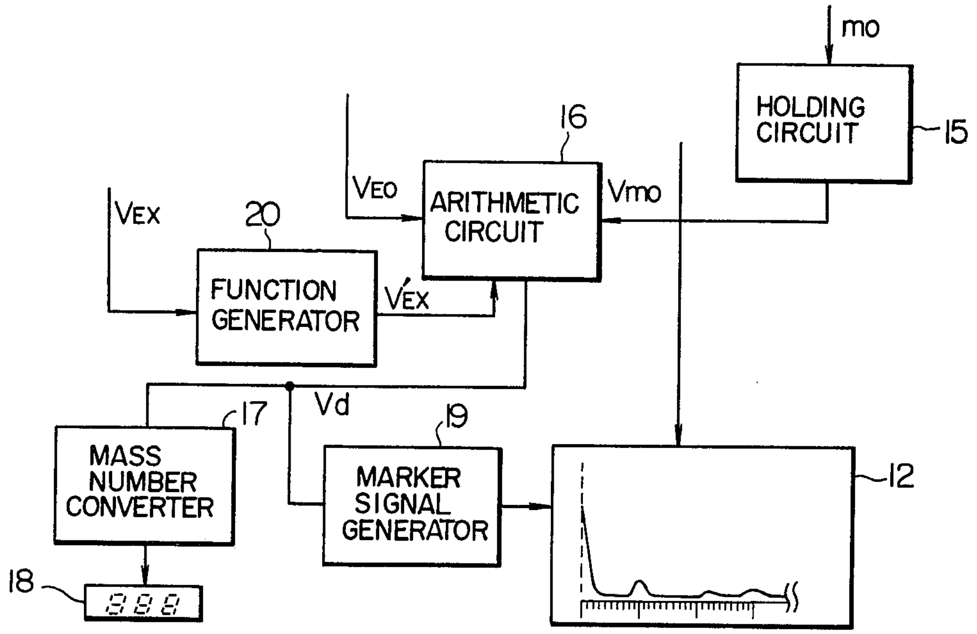
FIG. 5 is a fragmentary diagram, in block form, of another embodiment of the mass spectrometer in accordance with the invention.

Referring to FIG. 5, there is shown another embodiment of the invention which is featured by an additional element as compared with the embodiment of FIG. 3. The additional element is means for correcting the third electrical signal $V_{Ex}$ to $V'_{Ex}$, which means is exemplified as a function generator 20 in FIG. 5.

Figure 6:
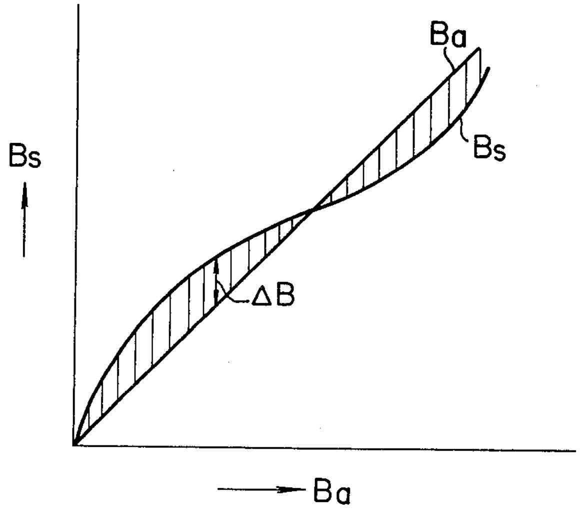
FIG. 6 is a graph showing a calibration curve for the correction of the value of the magnetic field in the embodiment of FIG. 5.

The magnetic field detector 8 detects the magnetic field generated by the electromagnet 3 which contributes to the dispersion of ions. The detected value of the magnetic field is not always coincident with the magnetic field generated by the electromagnet for the dispersion of ions. On the other hand, the correlation between the actual magnetic field and the magnetic field detected by the magnetic field detector 8 can be measured and determined previously. FIG. 6 shows the correlation between magnetic field $B_a$ contributing to the dispersion of ions and magnetic field $B_s$ detected by the magnetic field detector 8. The third electrical signal $V_{Ex}$ can be corrected by means for correcting deviation $\alpha B = |B_a - B_s|$, for example, a function generator 20 to ensure that the corrected electrical signal $V'_{Ex}$ accurately corresponding to the magnetic field $B_a$ contributing to the dispersion of ions can be fed to the arithmetic circuit 16. The function generator 20 may include a known function generator which gives folded-lines approximation of biased diode function at many points. Alternatively, the function generator may include a computer wherein the deviation $\Delta B$ is stored in an ROM or RAM and the stored data is read out and computed at a CPU to provide the difference between the measured data and the deviation. In accordance with this embodiment, since the output of the magnetic field detector 8, i.e., the third electrical signal $V_{Ex}$ standing for the output of the gain converter 11 is processed to the electrical signal which represents the accurate value of magnetic field contributing to the dispersion of ions, it is possible to correct the erroneous value of magnetic field measured by the magnetic field detector 8 and to determine the accurate mass number of the metastable ion.

As described above, according to the present invention, the mass number of the metastable ion can readily be determined without relying on the manual calculation of the data from the mass spectrometer.

What is claimed is:

1. A mass spectrometer of the type wherein a metashtable ion originating from a precursor ion is measured by scanning the magnetic and electric field at a constant ratio between the two fields, comprising:

- means for generating a first electrical signal representative of the mass number of the precursor ion;
- means for generating a second electrical signal corresponding to a value of the electric field at which the mass number of the precursor ion is detected;
- means for generating a third electrical signal corresponding to a value of the electric field which is being scanned;
- calculating means performing calculation on the first, second and third electrical signals to provide the mass number of the metastable ion; and
- indicating means for indicating the mass number of the metastable ion.

2. A mass spectrometer according to claim 1 which further comprises means for adding a predetermined correction to the third electrical signal, the corrected signal being applied to said calculating means, in place of said third electrical signal.

3. A mass spectrometer according to claim 1 wherein said calculating means comprises an arithmetic circuit for dividing the product of the first and third electrical signals by the second electrical signal.

4. A mass spectrometer according to claim 1 wherein said indicator means comprises a marker signal generator for generating, based on the output of said calculating means, a signal corresponding to the mass number.

5. A mass spectrometer according to claim 1 wherein said indicator means comprises a digital indicator for indicating the mass number based on the output of said calculating means.

6. A mass spectrometer according to claim 1 wherein said means for generating the first electrical signal comprises a magnetic field detector which detects a value of the magnetic field that is being scanned, a field-mass number converter which derives the mass number of the precursor ion from the value of the magnetic field detected by the magnetic field detector, and a holding circuit which holds the mass number of the precursor ion.

7. A mass spectrometer according to claim 3 wherein said arithmetic circuit comprises an analog arithmetic circuit.

8. A mass spectrometer according to claim 3 wherein said arithmetic circuit comprises an A/D converter and a microcomputer.

9. A mass spectrometer of the type wherein a metastable ion originating from a precursor ion is measured by scanning the magnetic and electric field at a constant ratio between the two fields, comprising:

- means for generating a first electrical signal representative of the mass number of the precursor ion;
- means for generating a second electrical signal corresponding to a value of the electric field at which the mass number of the precursor ion is detected;

means for generating a third electrical signal corresponding to a value of the electric field which is being scanned;

means for generating a correction signal by adding a predetermined correction to the third electrical signal;

calculating means performing calculation on the first, second and correction signals to provide the mass number of the metastable ion; and indicating means for indicating the mass number of the metastable ion.

10. A mass spectrometer according to claim 2 or 9 wherein said correcting means comprises a function generator which produces biased diode function.

11. A mass spectrometer according to claim 2 or 9 wherein said correcting means comprises a computer.

12. A mass spectrometer of the type wherein a metastable ion originating from a precursor ion is measured by scanning the magnetic and electric fields at a constant ratio between the two fields, comprising:

a reference voltage generator for generating an electrical signal corresponding to a value of the electric field at which the precursor ion is detected;

a gain converter for generating an electrical signal corresponding to a value of the electric field which is being scanned;

means including a holding circuit for generating and holding an electrical signal corresponding to the mass number of the precursor ion;

an arithmetic circuit performing calculation on the electrical signals from the reference voltage generator, gain converter and holding circuit to produce an electrical signal representative of the mass number of the metastable ion corresponding to values of the electric and magnetic fields which are being scanned; and indicating means for indicating the mass number based on the electrical signal of the arithmetic circuit.

13. A mass spectrometer of the type wherein a metastable ion originating from a precursor ion is measured by scanning the magnetic and electric fields at a constant ratio between the two fields, comprising:

a reference voltage generator for generating an electrical signal corresponding to a value of the electric field at which the precursor ion is detected;

a gain converter for generating an electrical signal corresponding to a value of the electric field which is being scanned;

a function generator for generating a correction signal by adding a predetermined correction to the electrical signal of the gain converter;

means including a holding circuit for generating and holding an electrical signal corresponding to the mass number of the precursor ion;

an arithmetic circuit performing calculation on the electrical signals from the reference voltage generator and holding circuit and the correction signal of the function generator to produce an electrical signal representative of the mass number of the metastable ion corresponding to values of the electric and magnetic fields which are being scanned; and indicating means for indicating the mass number based on the electrical signal of the arithmetic circuit.

14. A mass spectrometer according to claim 11 wherein said indicating means comprises a digital indicator for digitally indicating the mass number of the metastable ion based on the electrical signal of said arithmetic circuit.

15. A mass spectrometer according to claim 11 wherein said indicating means comprises a marker signal generator which generates a marker signal based on the electrical signal of the arithmetic circuit when a predetermined mass number of the metastable ion is detected.

16. A mass spectrometer according to claim 12 wherein said indicating means comprises a digital indicator for digitally indicating the mass number of the metastable ion based on the electrical signal of said arithmetic circuit.

17. A mass spectrometer according to claim 12 wherein said indicating means comprises a marker signal generator which generates a marker signal based on the electrical signal of the arithmetic circuit when a predetermined mass number of the metastable ion is detected.

* * * * *

UNITED STATES PATENT AND TRADEMARK OFFICE

CERTIFICATE OF CORRECTION

PATENT NO. : 4,256,963

DATED : March 17, 1981

INVENTOR(S) : Sadao TAKAHASHI et al

It is certified that error appears in the above—identified patent and that said Letters Patent is hereby corrected as shown below:

Foreign Application Priority Data [30] is incorrect. Should read :

--Sep. 29, 1978 [JP] Japan 53-119348--

Reference to German Application No. 2831936 should be deleted.

Signed and Sealed this

***Fifteenth* Day of *December 1981***

[SEAL]

*Attest:*

GERALD J. MOSSINGHOFF

*Attesting Officer* *Commissioner of Patents and Trademarks*